June 5, 1928.

J. WALSH

INDICATING INSTRUMENT

Filed June 13, 1927

Inventor:
James Walsh,
by
His Attorney.

Patented June 5, 1928.

1,672,666

UNITED STATES PATENT OFFICE.

JAMES WALSH, OF SWAMPSCOTT, MASSACHUSETTS, ASSIGNOR TO GENERAL ELECTRIC COMPANY, A CORPORATION OF NEW YORK.

INDICATING INSTRUMENT.

Application filed June 13, 1927. Serial No. 198,400.

My invention relates to indicating instruments and its object is to increase the visibility of the instrument pointer and scale and to reduce the eye strain and glare which is sometimes experienced in the reading of such instruments.

Figure 1:
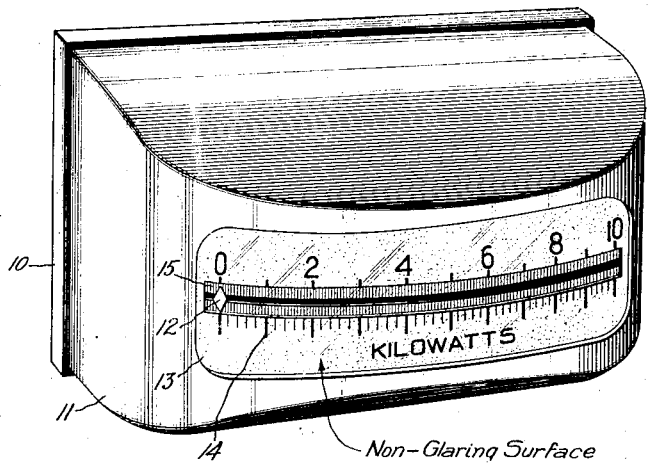

When a large number of measuring instruments are mounted upon a switchboard, or switchboards, it is not always feasible to have them all located at the level of the eye or in positions of maximum visibility. Some will be higher up than others and some will be located less favorably than others with respect to the general illuminating of the building. Due to the fact that it is the practice to use indicating instruments with an ordinary glass window over the scale it has been found that some instruments of a group are often difficult to read because of glare or the reflection of light from the glass or some polished surface beneath the glass. This is particularly true of the so-called edgewise switchboard instrument which has a cylindrically shaped scale and glass window as shown in Fig. 1. Some portion of the scale of such an instrument equipped with the ordinary glass window and mounted in the usual way is very apt to be blurred or invisible when viewed from certain positions because of glare. This difficulty is overcome by my invention which consists in employing a transparent window such as glass or celluloid the outer surface of which has been slightly roughened or treated in some way to prevent glare and locating the window in close proximity to the pointer and scale.

Figure 2:
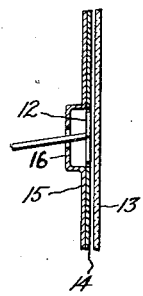
Figure 3:
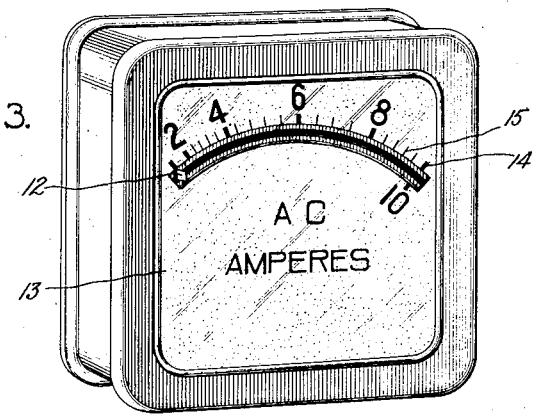

The features of my invention which are believed to be novel and patentable will be pointed out in the claims appended hereto. For a better understanding of my invention reference is made in the following description to the accompanying drawing in which Fig. 1 represents the invention applied to the edgewise type of indicating instrument; Fig. 2 represents a cross-section of the scale and glass window portion of the instrument shown in Fig. 1, and Fig. 3 shows the invention applied to an ordinary indicating instrument.

Referring to the drawing, Fig. 1 illustrates the conventional edgewise type electric measuring instrument for switchboard use. 10 is the base and 11 the cover, the front vertical wall of which is cylindrical in shape and corresponds in curvature to the arc in which the outer end of the moving pointer 12 of the instrument swings. The cover 11 is provided with a curved window 13 preferably of glass opposite to and parallel with the instrument scale 14. Heretofore this window has been formed of a curved piece of glass having a smooth outer surface. The illumination for such instruments generally comes from above and in front of the instrument and where the window is of smooth glass, glare along some portion of the scale often obscures or renders difficult the instrument reading requiring the observer to change his position in order to read the instrument at all. As a result of this difficulty the window and scale have been heretofore made somewhat smaller and narrower than that illustrated to reduce the possibility of glare.

According to the invention I employ a glass or other transparent window having an outer surface which has been treated in some way such as by a light sand blasting or chemical treatment so as to remove or destroy the smooth surface and thus prevent glare. The result of such treatment very materially reduces the visibility of the pointer and scale unless the pointer and scale are located in close proximity to the window; for example, ordinary printing located $\frac{1}{4}$ inch back of a glass having a medium sand blasted surface can not be read at all but becomes clearly legible if brought within $\frac{1}{16}$ inch of the glass. To overcome this difficulty several precautions may be taken, all of which are helpful; first, the sand blast or other polish removing operation is made very light, just enough to remove the objectionable glare due to reflected light; 2nd, the window is made as thin as practicable; if glass is used a thickness of $\frac{1}{16}$ inch or less is preferable. This reduces the distance between the outer surface and the scale and has the same effect as moving the scale nearer the window; and 3rd, the pointer and scale are brought into close proximity to the window. There is no particular difficulty in bringing the scale close to the window; in fact the scale might be printed on the back surface of the window. However this is generally not practicable because of calibration and parallax difficulties. Consequently, I prefer to arrange the outer surface of the pointer and the scale in substantial alinement and bring them as close to the window as is practicable without danger of the pointer rubbing against the window. The preferred arrangement is best shown in Fig. 2. The scale 14 is secured to a supporting plate 15. The plate 15 has a rearwardly extending channel 16 with a slot in it through which the pointer extends. The outer end of the pointer is in the form of a flat diamond-shaped target which is substantially flush with respect to the adjacent indicating surface of the scale 14 and having sufficient clearance so as not to rub as it is swung across the scale. This arrangement avoids errors in reading due to parallax.

The distance between the window and scale may average about $\frac{1}{16}$ inch which with a window $\frac{1}{16}$ inch thick will bring the scale about $\frac{1}{8}$ inch away from the outer surface of the window. With these distances the scale and pointer will be clearly visible unless the sand blasting or other surface cutting operation on the window has been carried way beyond that necessary to eliminate glare.

Due to the fact that the possibility of glare has been removed the window and consequently the scale and its markings may be made as large as desired. Eye strain is materially reduced and the instrument has a somewhat softer and more pleasing appearance than with the ordinary glass window.

Fig. 3 illustrates the invention as applied to another type of measuring instrument in which the front surface is flat and the pointer moves in a vertical arc instead of in a horizontal arc. The same general arrangement as previously explained is employed and like reference characters are used to designate like parts. Owing to the absence of glare it is feasible to use the roughened glass or other transparent material over practically the entire front surface as shown, leaving ample room for the printing of data other than that referring to the scale.

The glass or other window material may be made nonglaring in many different ways. A very light sand blast gives very good results. The surface if of glass may also be etched to a slight extent by certain chemicals. The window may also be covered by a thin translucent coating which is non-glaring in character.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. A measuring instrument having a casing, a transparent window in said casing, said window having a non-glaring outer surface, an instrument scale and a pointer movable with respect to said scale within said casing, said scale and pointer being located sufficiently close to the inner surface of said window to be clearly visible therethrough.

2. A measuring instrument having a casing, a glass window in said casing having a non-glaring outer surface, a pointer for said instrument mounted to swing closely adjacent to the inner surface of said window, and a scale for said instrument with which said pointer cooperates located closely adjacent to the inner surface of said window.

3. A measuring instrument provided with a scale, a pointer mounted for movement with respect to and in substantial alinement with the adjacent indicating surface of said scale, and a thin transparent window provided with a non-glaring outer surface located adjacent to and in close proximity to said scale.

4. A measuring instrument provided with a scale, a pointer mounted for movement with respect to said scale, the indicating surfaces of said pointer being substantially in alinement with the adjacent indicating surface of said scale, a casing for said instrument provided with a transparent window opposite to said scale, said window having a non-glaring outer surface, the distance between the outer surface of said window and scale being less than $\frac{1}{16}$ inch.

5. A measuring instrument having a casing, a glass window in said casing, said window not exceeding about $\frac{1}{16}$ inch in thickness and having a non-glaring outer surface, a scale within said casing visible through said window, a movable pointer cooperating with said scale, the distance between said window and said scale and pointer not exceeding about $\frac{1}{16}$ inch.

6. A measuring instrument provided with a pointer arranged to swing in a horizontal arc, a scale mounted adjacent to the path of movement of the outer end of said pointer, a casing for said instrument, a thin glass window in said casing located closely adjacent to and parallel to said scale, said window having a non-glaring outer surface.

7. A measuring instrument having a scale, a pointer movable with respect to said scale, a casing for said instrument substantially the entire front portion of which comprises a transparent window having a non-glaring outer surface, said pointer and scale being located closely adjacent to the inner surface of said window so as to be clearly visible therethrough.

In witness whereof I have hereunto set my hand this 10th day of June, 1927.

JAMES WALSH.